United States Patent
Gonier et al.

(10) Patent No.: US 11,816,623 B2
(45) Date of Patent: *Nov. 14, 2023

(54) PERFORMANCE EVALUATION SYSTEMS AND METHODS

(71) Applicant: The DGC Group, Downers Grove, IL (US)

(72) Inventors: Devin Gonier, Denver, CO (US); Morgan Hartley, Denver, CO (US); Dennis Gonier, Chicago, IL (US)

(73) Assignee: The DGC Group, Downers Grove, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,109

(22) Filed: Jan. 17, 2022

(65) Prior Publication Data

US 2022/0138663 A1    May 5, 2022

Related U.S. Application Data

(63) Continuation of application No. 16/716,109, filed on Dec. 16, 2019, now Pat. No. 11,227,251.

(60) Provisional application No. 62/779,790, filed on Dec. 14, 2018.

(51) Int. Cl.
*G06Q 10/0639* (2023.01)
*G06Q 30/0235* (2023.01)

(52) U.S. Cl.
CPC ... *G06Q 10/06398* (2013.01); *G06Q 30/0235* (2013.01)

(58) Field of Classification Search
CPC ......... G06Q 10/0639; G06Q 10/06398; G06Q 10/06395; G06Q 30/0235
See application file for complete search history.

(56) References Cited

U.S. PATENT DOCUMENTS

| | | | |
|---|---|---|---|
| 8,121,888 B1 * | 2/2012 | Cohen | G06Q 10/06398 |
| | | | 705/7.41 |
| 10,535,230 B2 | 1/2020 | Lutnick | |
| 11,227,251 B2 | 1/2022 | Gonier et al. | |
| 2003/0233278 A1 | 12/2003 | Marshall | |
| 2004/0093402 A1 | 5/2004 | Liu et al. | |
| 2014/0074565 A1 | 3/2014 | Green | |
| 2014/0135084 A1 | 5/2014 | Venkat et al. | |
| 2015/0095114 A1 * | 4/2015 | Hyde | B60L 58/40 |
| | | | 705/7.38 |
| 2017/0213169 A1 * | 7/2017 | Chaturvedi | G06Q 50/01 |
| 2017/0301039 A1 * | 10/2017 | Dyer | G06Q 10/063114 |
| 2018/0293603 A1 * | 10/2018 | Glazier | G06Q 50/01 |
| 2019/0050887 A1 * | 2/2019 | Nelsen | G06Q 30/0201 |
| 2021/0398163 A1 * | 12/2021 | Nelsen | G06N 3/02 |

* cited by examiner

*Primary Examiner* — Rutao Wu
*Assistant Examiner* — Stephen S Swartz
(74) *Attorney, Agent, or Firm* — Kilpatrick Townsend & Stockton LLP (57) ABSTRACT

Described are systems and methods for tracking performance by monitoring and evaluating performance metrics on a repetitive basis to assign performance scores and incentivizing high performance by assigning awards to high performers. Multiple users may compete with one another for performance rankings and wager all or portions of award amount on their performance for future performance cycles to potentially increase future awards.

20 Claims, 3 Drawing Sheets

PERFORMANCE EVALUATION SYSTEMS AND METHODS

CROSS-REFERENCE TO RELATED APPLICATIONS

This application is a continuation of U.S. application Ser. No. 16/716,109, filed Dec. 16, 2019, which claims the benefit of and priority to U.S. Provisional Application No. 62/779,790, filed on Dec. 14, 2018, which are hereby incorporated by reference in their entireties.

BACKGROUND

Performance evaluation is typically a manual process involving subjective factors. Feedback on performance may not be received in real-time and may only be received during manual performance review output sessions. Such a configuration may not be useful for achieving performance improvements.

SUMMARY

The present disclosure provides advances over previous performance evaluation systems by providing automated real-time feedback to users to allow users to tailor their performance in real-time to attempt to adjust a final performance evaluation for a performance period. Automated collection of data can be useful for providing objective metrics about a user's performance. Beyond allowing a user to receive feedback in real-time and tailor performance on the fly, the present disclosure provides a system for incentivizing improved performance in future performance periods.

In various aspects, the present disclosure provides systems, methods, and computer program products for evaluation of performance. In a first aspect, systems for performance tracking, evaluation, or analysis are provided. An example system of this aspect comprises one or more processors; and a non-transitory computer readable storage medium including instructions that, when executed by the one or more processors cause the one or more processors to perform operations. Example operations performed using the one or more processors may include identifying a duration for a performance cycle; identifying an award amount for the performance cycle; determining that a start of the performance cycle has occurred; receiving event data associated with activity of a plurality of users during the performance cycle; determining that an end of the performance cycle has occurred; determining final performance scores for the plurality of users during the performance cycle using the event data, such as where individual users of the plurality of users have corresponding final performance scores; assigning portions of the award amount to a first subset of the plurality of users based on the final performance scores, such as where users of the first subset have corresponding award portions; and receiving one or more inputs identifying performance wagers for at least a portion of the first subset of the plurality of users for use in a new performance cycle, such as where the performance wagers correspond to, include, or are associated with a fraction of an award portion.

Optionally, example operations include determining unwagered fractions of the award amount for each of the first subset of the plurality of users; generating an output identifying the unwagered fractions of the award amount to be provided to each of the first subset of the plurality of users, such as where the output triggers a transfer of the unwagered fractions of the award amount to each of the first subset of the plurality of users. Optionally, example operations include identifying a threshold performance score, such as where the first subset of the plurality of users corresponds to users of the plurality of users for which a corresponding final performance score is above the threshold performance score. In some embodiments, identifying the threshold performance score includes receiving input corresponding to a determination of the threshold performance score.

Optionally, the operations further comprise determining one or more interim performance scores on a periodic basis or in real-time during the performance cycle; and generating an output providing the one or more interim performance scores using event data received during the performance cycle. Determining the one or more interim performance scores may optionally be performed in response to a request for the interim performance score received at the one or more processors.

Optionally, the performance cycle corresponds to a period of time during which event data is generated and accumulated based on activity of the plurality of users. Optionally, identifying the duration for the performance cycle includes receiving input corresponding to a determination of the duration. Optionally, identifying the award amount includes receiving input corresponding to a determination of the award amount. Optionally, the activity corresponds to tasks performed by the plurality of users, or to one or more of a number of tasks completed, an average task duration, a shortest task duration, a longest task duration. Optionally, a performance wager corresponds to a prediction that a new final performance score for a user in the new performance cycle will be above one or more wagered threshold performance scores.

Optionally, the operations further include identifying an algorithm for evaluating event data to generate performance scores. For example, determining the final performance scores optionally includes using the algorithm and the event data. The algorithm may be a predetermined algorithm and may be provided as an input or may be provided on a computer-readable storage medium. In some cases, identifying the algorithm can include receiving input corresponding to a determination of the algorithm, such as from a plurality of different predetermined algorithms.

Example operations useful for systems of this aspect may also include identifying a new award amount for the new performance cycle; determining that a new start of the new performance cycle has occurred; receiving new event data associated with activity of the plurality of users during the new performance cycle; determining that a new end of the new performance cycle has occurred; determining new final performance scores for the plurality of users during the new performance cycle using the new event data, such as where individual users of the plurality of users have corresponding new final performance scores; assigning new portions of the new award amount to a new subset of the plurality of users based on the new performance scores, such as where individual users of the new subset are assigned corresponding new award portions; comparing the new performance scores with the performance wagers to identify satisfied performance wagers and non-satisfied performance wagers; and assigning additional portions of the new award amount based on the satisfied performance wagers. Optionally, the operations further include generating an output identifying the additional portions of the new award amount be provided to users of the plurality of users having satisfied performance wagers, such as where the output triggers a transfer of the additional portions of the new award amount to users of the plurality of users having satisfied performance wagers. Optionally, the operations further include receiving one or more inputs identifying new performance wagers for at least a portion of the new subset of the plurality of users for use in a further performance cycle, such as where the new performance wagers correspond to a new fraction of a new award portion. Optionally, the operations further include determining unwagered fractions of the new award amount for each of the new subset of the plurality of users; generating an output identifying the unwagered fractions of the new award amount to be provided to each of the new subset of the plurality of users, such as where the output triggers a transfer of the unwagered fractions of the new award amount to each of the new subset of the plurality of users. Optionally, the new award includes a carryover award amount corresponding to wagered fractions of the award portions, such as from a previous performance cycle. Optionally, the new award does not include a carryover award amount corresponding to wagered fractions of the award portions, such as from a previous performance cycle. In some embodiments, the additional portions of the new award amount are greater than corresponding wagered fractions of the award portions.

In some embodiments, these operations may optionally be performed on a repeated basis in a suitable configuration, such as to allow the systems of this aspect to continue operations on an as needed or as desired basis for any suitable number of performance cycles. Each different performance cycle may have the same or a different duration. Each award amount for different performance cycles may be the same or different. The users participating in each different performance cycle may be the same or different.

In another aspect, methods are provided, such as methods for performance tracking, evaluation, or analysis. An example method of this aspect comprises identifying a duration for a performance cycle; identifying an award amount for the performance cycle; determining that a start of the performance cycle has occurred; receiving event data associated with activity of a plurality of users during the performance cycle; determining that an end of the performance cycle has occurred; determining final performance scores for the plurality of users during the performance cycle using the event data, such as where individual users of the plurality of users have corresponding final performance scores; assigning portions of the award amount to a first subset of the plurality of users based on the final performance scores, such as where users of the first subset have corresponding award portions; and receiving one or more inputs identifying performance wagers for at least a portion of the first subset of the plurality of users for use in a new performance cycle, such as where the performance wagers correspond to a fraction of an award portion. In embodiments, methods of this aspect or portions thereof may be performed using a computing system comprising one or more processors.

Optionally, methods of this aspect may further comprise determining unwagered fractions of the award amount for each of the first subset of the plurality of users; and generating an output identifying the unwagered fractions of the award amount to be provided to each of the first subset of the plurality of users, such as where the output triggers a transfer of the unwagered fractions of the award amount to each of the first subset of the plurality of users.

Optionally, methods of this aspect may further comprise identifying a threshold performance score, such as where the first subset of the plurality of users corresponds to users of the plurality of users for which a corresponding final performance score is above the threshold performance score. Optionally, identifying a threshold performance score may include receiving input corresponding to a determination of the threshold performance score.

Optionally a method of this aspect may further comprise determining one or more interim performance scores on a periodic basis or in real-time during the performance cycle; and generating an output providing the one or more interim performance scores using event data received during the performance cycle. Optionally the interim performance scores may be determined and/or output in response to a request for the interim performance scores. In some cases, the interim performance scores may be continuously determined and relayed/output on demand.

Optionally, the performance cycle corresponds to a period of time during which event data is generated and accumulated based on activity of the plurality of users. Optionally, identifying the duration for the performance cycle includes receiving input corresponding to a determination of the duration. Optionally, identifying the award amount includes receiving input corresponding to a determination of the award amount. Optionally, the activity corresponds to one or more of a number of tasks completed, an average task duration, a shortest task duration, a longest task duration.

Optionally, methods of this aspect may further comprise identifying an algorithm for evaluating event data to generate performance scores, such as where determining the final performance scores includes using the algorithm and the event data. Optionally, a performance wager corresponds to a prediction that a new final performance score for a user in the new performance cycle will be above one or more wagered threshold performance scores.

Optionally, methods of this aspect may further comprise identifying a new award amount for the new performance cycle; determining that a new start of the new performance cycle has occurred; receiving new event data associated with activity of the plurality of users during the new performance cycle; determining that a new end of the new performance cycle has occurred; determining new final performance scores for the plurality of users during the new performance cycle using the new event data, such as where individual users of the plurality of users have corresponding new final performance scores; assigning new portions of the new award amount to a new subset of the plurality of users based on the new performance scores, such as where individual users of the new subset are assigned corresponding new award portions; comparing the new performance scores with the performance wagers to identify satisfied performance wagers and non-satisfied performance wagers; and assigning additional portions of the new award amount based on the satisfied performance wagers. Optionally, methods of this aspect may further comprise generating an output identifying the additional portions of the new award amount be provided to users of the plurality of users having satisfied performance wagers, such as where the output triggers a transfer of the additional portions of the new award amount to users of the plurality of users having satisfied performance wagers. Optionally, methods of this aspect may further comprise receiving one or more inputs identifying new performance wagers for at least a portion of the new subset of the plurality of users for use in a further performance cycle, such as where the new performance wagers correspond to a new fraction of a new award portion.

Optionally, methods of this aspect may further comprise determining unwagered fractions of the new award amount for each of the new subset of the plurality of users; generating an output identifying the unwagered fractions of the new award amount to be provided to each of the new subset of the plurality of users, wherein the output triggers a transfer of the unwagered fractions of the new award amount to each of the new subset of the plurality of users. Optionally, the new award includes a carryover award amount corresponding to wagered fractions of the award portions. However, in some cases the new award does not or may not include a carryover award amount corresponding to wagered fractions of the award portions. Optionally, the additional portions of the new award amount are greater than corresponding wagered fractions of the award portions.

In another aspect, computer program products are provided herein such as computer program products comprising a non-transitory computer readable storage medium containing instructions that, when executed by one or more processors, cause the one or more processors to perform operations. For example, the operations may correspond to any of the methods described herein.

Without wishing to be limited to any particular embodiments, example implementations of performance monitoring and evaluation techniques, systems, and methods will be described. It will be appreciated that the various embodiments of techniques, systems, and methods described herein may be combined in any fashion and may have certain features excluded, depending on the configuration and implementation selected for a particular application. Further, a number of features of the techniques, systems, and methods described may be described in terms of particular exemplary values, such as number of users, threshold performance scores, number of wager cycles, performance cycle duration, total award amount, value of performance points, or the like, but it will be appreciated that these values are merely non-limiting examples and that other particular values may be used, depending on the desired configuration.

DETAILED DESCRIPTION

The present disclosure provides systems and methods for improving performance by monitoring and evaluating performance metrics on a repetitive basis (e.g., periodic or continuous) to assign a performance score (also referred to herein as an index score) and associating performance scores above a threshold performance score with a performance incentive. The systems and methods allow for evaluation, retrieval, and presentation of performance scores on an as needed basis, such as daily, weekly, or even in real-time, which provides feedback so performance can continue to be optimized during the performance period and so that performance scores can be modified. Multiple users may compete with one another for performance rankings, which can serve as criteria for a performance incentive. Use of threshold performance scores based on these rankings allow for both rewarding high performance over low performance and optimizing the value of a potential award by limiting access to the award pool to only those who have scores above the ranking threshold.

Beyond incentivizing high performance by tracking performance metrics, the systems and methods described herein may also allow users to reserve and wager portions of an award received for one performance cycle on the user's expected performance during a subsequent performance cycle. Such a configuration may further enhance performance by allowing the user to wager a portion of an award and receive an increased award if a particular performance goal associated with the wager is achieved. Example performance goals may be a particular performance score value, a particular value of one or more metrics, or the like.

In some embodiments, performance monitoring and evaluation techniques, systems, and methods may employ a number of options that are predefined. These options may be fixed or may be allowed to change during operation, but the variability of these options may impact the specific operation, though the performance monitoring and evaluation techniques, systems, and methods may still operate according to a particular algorithm despite any changes to the various options.

For example, one option that may be predefined is a performance cycle duration. A performance cycle duration may identify the amount of time during which user performance is evaluated before awards are distributed. Example performance cycle durations may be any suitable time period from 1 hour to 1 year. In various embodiments, a performance cycle duration may be 1 hour, 2 hours, 4 hours, 8 hours, 12 hours, 1 day, 2 days, 5 days, 10 days, 15 days, 30 days, 1 week, 2 weeks, 4 weeks, 1 month, 2 months, 3 months, 6 months, or 1 year, for example. During the duration of the performance cycle, user performance may be evaluated on a repeated basis (e.g., hourly, daily, weekly) and a final performance score determined at the end of the duration. Sub-durations may also be used to provide interim performance score determinations during portions (e.g. fractions) of the performance cycle duration. In some embodiments, multiple interim performance score determinations may optionally be aggregated (e.g., summed, averaged, etc.) to provide a final performance score value at the end of the performance cycle duration.

As another example, an option that may be predefined is a hierarchy. The hierarchy may define various groups, with each group representing one or more users, various regions, with each region representing one or more groups, etc. Each user may also have a role, representing a type of the user and/or whether the user is responsible for managing other users or various components of the hierarchy, such as groups, regions, etc. Each hierarchy level may be assigned an identifier associated with the level in the hierarchy. In some cases, an individual user's performance score is individual and not connected to other users' performance scores. In some cases, an individual user's performance score is based on the performance score of the hierarchy they are part of, such as the performance score of a group. In some cases an individual user's performance score is based on the performance score of components of a hierarchy that the user manages, such as a group or region.

As another example, an option that may be predefined is a threshold performance score. Threshold performance scores may be used to separate award receiving users from non-award receiving users. Threshold performance scores may represent a performance score at and/or above which a user receives an award at the end of a performance cycle and below which a user does not receive an award at the end of a performance cycle. Threshold performance scores may be based on the hierarchy. For example, a threshold performance score may be used to separate award-receiving groups from non-award receiving groups. Different threshold performance scores may be established for each different level of a hierarchy and/or for each different user role. Since threshold performance scores are likely calculated based on the group parameters itself (i.e., a manager's performance score is calculated differently than a lower level employee), different levels of a hierarchy can have different threshold scores. Threshold performance scores may be identified based on a particular performance score value or may be based on a percentage, such that only a certain percentage of users or groups receive an award at the end of a performance cycle. For example, the top 40% of a group may receive an award, while the bottom 60% do not receive an award. As another example, a threshold performance score may be a specific performance score value and users having an equal and/or higher performance score than the threshold may receive an award at the end of a performance cycle while users having a performance score lower and/or equal to the threshold may not receive an award at the end of a performance cycle. In some cases, multiple threshold performance scores may be established to award different criteria or performance. For example, a first threshold performance score may be established, which may correspond to a minimum performance score needed to receive a first award. A second threshold performance score may be established, which may correspond to a minimum performance score needed to receive a second award. Such a configuration may be useful for providing a best performer or a highest group of performers with increased incentives/awards. In many cases, the awards may be directly proportional to the performance scores.

As another example, an option that may be predefined is an award amount. An award amount may represent a monetary or other value to be distributed among award-receiving users at the end of a performance cycle. In some cases, multiple awards may be established with different award amounts based on user role, hierarchy level, etc. For example, one award amount may be predefined for a first user role, such that the award amount is distributed among award-receiving users of the first user role at the end of the performance cycle and, optionally, a separate award amount may be predefined for the group hierarchy level, such that the separate award amount is distributed among users within award-receiving groups.

As another example, an option that may be predefined is a formula for computing a user's or hierarchical level's performance score, represented herein as a numerical value or performance score. Performance scores may fall within an arbitrary range of values, such as from 0 to 100 or 0 to 200, etc., and may be normalized in some cases. Performance scores may be determined, for example, based on one or more metrics that are identified for each user, role, or hierarchical level, and/or based on event data associated with a user, role, or hierarchical level, for example. Example event data may correspond to or include times (e.g., start time, end time, time duration, etc.), particular tasks or task identifiers, values, binary information, or the like associated with user activity. Event data may be obtained and transformed into metric data or performance score data using a computing system, processor, or special purpose system.

Metrics may also be options that are predefined and generated based on event data associated with a user, role, or hierarchical level, for example. Example metrics include, but are not limited to, a time duration for performing a particular task (e.g., average time duration), a number of tasks performed within a particular time duration, a total time duration for a particular number of tasks, a number of tasks having durations that fall outside a particular time duration, a value (e.g., monetary value) of performed tasks, or the like. Metrics may be determined using raw event data. In some cases, metrics may be directly received or determined by a computing system, processor, or special purpose system, such as by tracking user activity. In some cases, metrics may be determined by a computing system, processor, or special purpose system on a repeated basis, such as by obtaining raw event data and populating a database with information derived from the raw event data. Metrics may be arranged as or in one or more databases, which may be stored in one or more non-transitory computer readable media, and retrieved by a computing system, processor, or special purpose system to determine performance scores on a repeated basis.

In some cases, a performance score may be determined using one or more intermediate scores, which may in turn be determined based on various metrics. The intermediate scores may be useful for tracking certain performance attributes or metrics that may be independent from other performance attributes or metrics. For example, metrics relating to number of tasks may be used for generating a first intermediate score, while metrics relating to a value may be used for generating a second intermediate score, or while metrics relating to subjective ratings may be used for generating a third intermediate score. The intermediate scores may be independently tracked, monitored, provided, and/or presented to users to allow users to self-assess performance, for example, based on certain metrics. At the end of a performance cycle, each user or hierarchical score group may have their own particular performance score which provides a ranking of performance relative to other users or groups and be associated with a point value or fractional portion of an award amount, based on the total number of users receiving awards and their relative performance.

Performance scores may also be determined based on or using one or more subjective ratings, such as user-provided subjective ratings (e.g., provided by a manager or peer user) or customer ratings (e.g., provided by a third party). Subjective ratings may optionally be associated with a particular event and may, for example, impact the overall performance score of a user or may impact the particular event's contribution to the overall performance score of the user. Subjective ratings may be obtained with event data or may be obtained separately via user input. Subjective ratings may be used to increase and/or decrease a performance score, depending on the particular formula used for determining performance score and the subjective ratings. Example subjective ratings may include or be derived from customer surveys or ratings, managing user surveys or ratings, intra-user surveys or ratings. As an example, customers and managing or other users may provide a subjective rating to another user, such as a rating from one to five stars or a badge representing meritorious behavior.

Various different formulas may be used for determining performance scores using one or more of the above-identified metrics, intermediate scores, subjective ratings, and/or event data. The formulas applied for each user, role, hierarchical level, etc., may be the same or different, depending on the particular application. Stated another way, the formulas for different users, roles, hierarchical levels, etc., may be different from one another or may be the same. For example, in some embodiments it may be meaningful to assess performance of users of a particular role based on the number of tasks performed within a particular time duration, while such assessment may not be meaningful for assessing performance of users of a different role. In some cases, a performance score of a managing user may be dependent on the activity of the users being managed rather than the managing user's own activity. In some cases, a performance score of a group or other hierarchical level may be dependent on the activity of the users within the group or hierarchical level.

Figure 1:
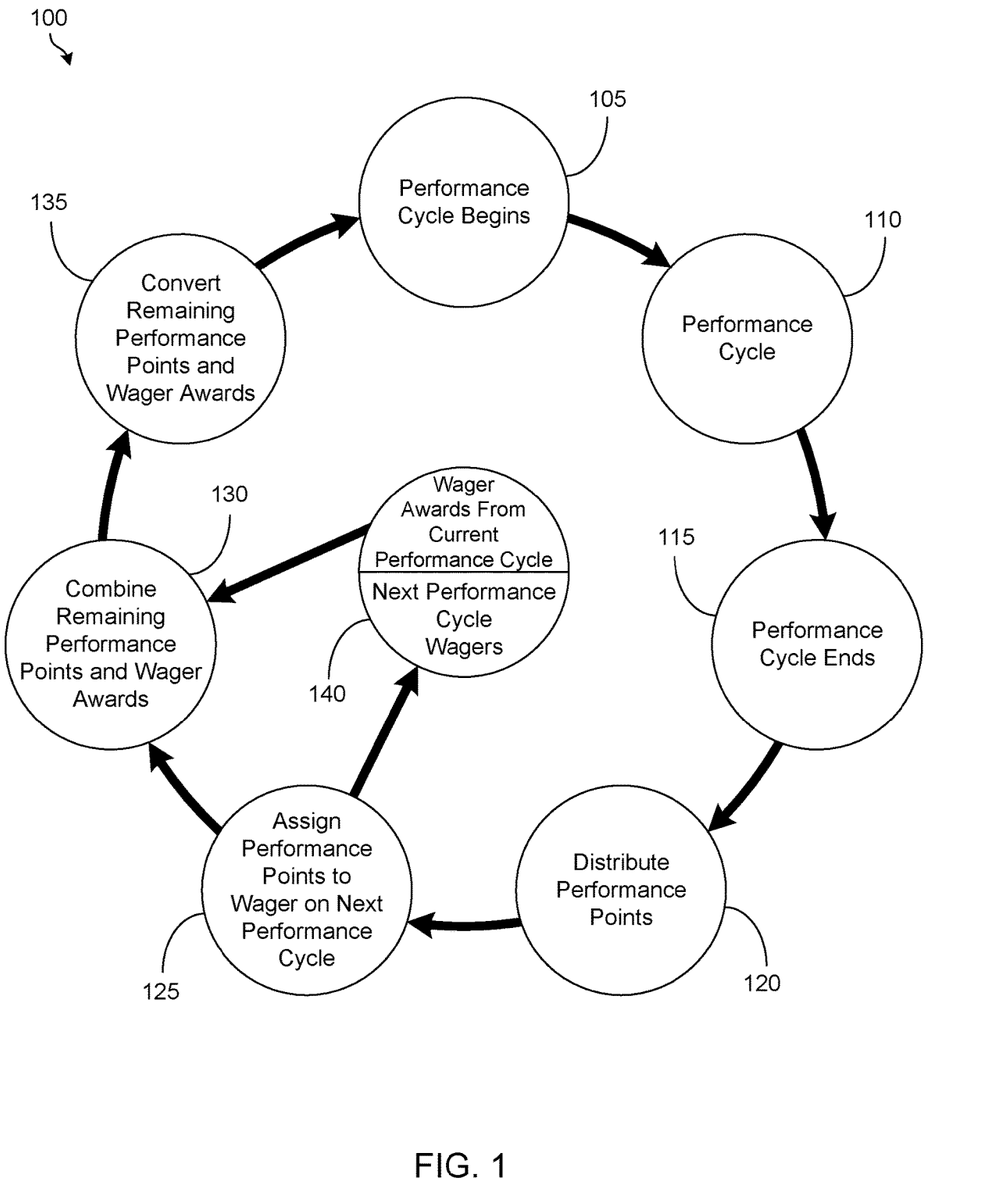
FIG. 1 provides a schematic overview of a process for monitoring and evaluating performance and determining and assigning awards in accordance with some embodiments.

FIG. 1 provides an overview of an example process 100 for monitoring and evaluating performance and determining and assigning awards. At 105, performance cycle begins and all hierarchy, awards, threshold performance scores, and other options may be fixed, such as for the duration of the performance cycle.

As a specific example of certain of the above-described options, a performance cycle duration may be quarterly (i.e., 3 months). Additionally, interim performance evaluations may optionally be determined on an hourly or daily basis and optionally presented to a user to provide feedback on user performance. During a sub-duration of 1 week, the performance evaluations may change based on activity occurring each hour or each day, but then be fixed at the end of each week as a sub-performance score. The total or overall performance score value at the end of the quarter may then be a sum of each of the weekly sub-performance scores, for example. As another example, the total or overall performance score may be determined at the end of the performance cycle based on all activity occurring during the performance cycle.

As another specific example, a hierarchy may be defined with users as the lowest level, with users organized into various groups, such as based on geography, role, association with particular entities, etc., with one or more managing users responsible for managing each group, with groups organized into regions, with one or more managing users responsible for managing each region. Each user may have an individual performance score and/or may have a hierarchy level performance score. For example, users in a group designated Group A may have an individual performance score and/or a Group A performance score. Use of individual and grouped performance scores may be useful for individually incentivizing and rewarding high performance by individual users and may also be useful for rewarding high performing groups independent of the performance of individual users within the group.

As another specific example, a threshold performance score may be set such that users or hierarchy levels falling within a certain percentile may be award-receiving. For example, a threshold performance score may be set so that a particular highest percentile of users receive an award rather than identifying a particular performance score that must be met to receive an award. In some cases, a threshold performance score is not used or is set to 0% so that all users receive an award. As another example, a threshold performance score may be set so that a particular highest percentile of hierarchy level members (e.g., groups) receive an award (e.g., users that are members of groups within the top 50 percentile of groups receive an award). In some cases, multiple threshold performance scores are used. For example, the top 50 percentile of groups may receive or share in a first award at the end of a performance cycle and the top 10 percentile of all users may receive or share in a second award at the end of the performance cycle.

As another specific example, an award amount may be determined in terms of value, such as a monetary value or a point value, which may be equivalent to or convertible to a monetary value, for example. An example award amount may be $10,000, which may be divided among all award-receiving users at the end of a performance cycle based on each user's performance score. At the end of a performance period, the award amount may be divided by the total number of performance points that exist for those above the performance threshold, thereby establishing an exchange rate of performance points to dollars, for example, such that users may identify or convert performance points to monetary amounts. In the case of multiple threshold performance scores, each threshold performance score may optionally be associated with a respective award amount. In other words, different groups may have different award budgets (i.e., lower level employees may share awards from a certain budget or award amount, while managers may share awards from a different budget or award amount).

At 110, the performance cycle runs, and performance scores are determined on a repeated basis. Performance scores may be generated using a predefined formula, as described above, which may be fixed for the duration of the current performance cycle. The predefined formula may vary from performance cycle to performance cycle, in some embodiments, but may alternatively be fixed across different performance cycles. In one embodiment, performance metrics for a plurality of users or hierarchical levels may be determined by a computing system, processor, or special purpose system, using event data that may be obtained, optionally via one or more data network transmissions, on a repeated basis. Optionally, the computing system may proactively retrieve the event data by transmitting a request and receiving the raw event data as a response. In some cases, the computing system may receive the raw event data as a direct communication or population into a table of a database, for example.

The raw event data may be transformed into various metrics based on attributes of the different events in the raw event data. For example, the raw event data may include a first entry for a particular user indicating the start time of an activity and a second entry for the particular user indicating the finishing time of the activity. Any suitable activity may be represented in the event data. Example event data associated with various activities may include, but are not limited to, a time that an activity begins (e.g., a date or time of departure, a time a telephone call is started, a date or time a sales inquiry is received) a time that an activity completes (e.g., a date or time of arrival, a time a telephone call completed, a date or time a sale is completed), a value (e.g., sale or revenue value, a quantity of goods, a distance traveled), a frequency of occurrence or non-occurrence of a particular event with our without a precondition (e.g., a sale given factors that influence the likelihood of a sale), the outcome of an event as compared to its expected outcome (e.g., the success of a service performed the stage in a process for a service performed), the relationship between an event and related future or past events (e.g., the retention or continued use of a user), or the like.

Different metrics may be determined based on the event data, such as determination of a number completed activities, a time duration for a completed activity or an average time duration for all completed activities, a total distance traveled, a total sales quantity, etc. Raw event data may include event data associated with multiple users and may be arranged as a table, spreadsheet, or database. Event data associated with the multiple users may be arranged in a particular order, such as according to time, according to user, according to activity, or may be arranged in no particular order. Parsing of the event data and conversion to metric information may include evaluating user information in the event data, time information in the event data, activity information in the event data. In some cases, an individual metric may represent or be used as a performance score or an interim performance score. Summary tables of event data may optionally be indexed by a particular user or group, so that summary information for that user or group can be queried and updated when creating performance points or performance thresholds.

As performance scores are periodically determined, the performance scores may be presented to users, including individual performance scores, sub-performance scores, interim performances scores, hierarchy level (e.g., group) performance scores, for example. In some instances, users may be presented with the performance scores of other users or other hierarchy levels to allow the user to identify their ranking among other users/hierarchy levels. In some cases, other users' or hierarchy level's performance scores may not be presented to a user but instead a ranking may be presented to the user. Predicted performance scores may also be presented, such as to provide users with expected information relating to the performance score at the end of the performance cycle.

In some cases, the techniques, systems, and methods described herein may provide a predicted or expected final performance score based on a combination of historical performance metric data (i.e., previous to the current performance cycle) and current performance metric data (i.e., obtained during the current performance cycle). The predicted or expected final performance score may be output or displayed so that a user can obtain a prediction of their expected performance score at the end of the performance cycle and receive feedback based on changes in their activity. The predicted or expected final performance score may, for example, be determined using performance metric data for a duration as long as the performance cycle duration, but offset to the date at which the prediction is made. For quarter yearly performance cycle duration for the quarter from January 1 through March 31, the predicted final performance score at any date between January 1 and March 31 (i.e., before the end of March 31) may be evaluated using performance metric data for the immediate prior 3 months. For example, on a date of February 25, the predicted performance score may use performance metric data for the 3 month period of November 25 through February 24, which includes historical performance metric data from November 25 through December 31 and current performance metric data from January 1 through February 24. As the date advances closer to the final date of the performance cycle (March 31 in this case), more current performance metric data will be included in the predicted performance score.

At 115, the performance cycle ends and the performance scores for the various users, roles, and hierarchy levels becomes fixed for the performance cycle. Performance scores above the performance threshold may be distributed to the users as performance points, at 120. The performance points may be equivalent to or representative of an award amount provided to the award-receiving users. In some cases, the award amount given to each award-receiving user is proportional to the user's performance points, such as a fractional amount of the total award based on the user's performance points as compared to the total of the performance points of all award-receiving users. In some cases, the award amount given to each award-receiving user is proportional to the user's performance points and wager awards, such as fractional amount of the total award based on the user's performance points as compared to the total of the performance points of all award-receiving users and all points awarded via performance wagers (discussed in more detail below). In the case of 10 total users and a threshold performance score set at the top 50 percentile, the award amount would be distributed among 5 users of the 10 total users. Depending on the performance score breakdown, however, each of the 5 award-receiving users may receive different award amounts. For example, consider a performance score distribution as illustrated in Table 1:

TABLE 1

| User | Performance Score | Performance Points | Fractional Award | Award Amount |
|---|---|---|---|---|
| 1 | 120 | 120 | 120/500 = 24% | $2,400 |
| 2 | 114 | 114 | 114/500 = 22.8% | $2,280 |
| 3 | 98 | 98 | 98/500 = 19.6% | $1,960 |
| 4 | 88 | 88 | 88/500 = 17.6% | $1,760 |
| 5 | 80 | 80 | 80/500 = 16% | $1,600 |
| 6 | 60 | 0 | 0 | $ 0 |
| 7 | 56 | 0 | 0 | $ 0 |
| 8 | 51 | 0 | 0 | $ 0 |
| 9 | 45 | 0 | 0 | $ 0 |
| 10 | 36 | 0 | 0 | $ 0 |

Here, the total of all performance scores is 750. The total of the performance scores of the top 50 percentile of users (i.e., Users 1-5), however is 500. The award amount provided to Users 1-5 here is then the proportional amount of the user's performance score to the total of the performance scores of Users 1-5. Stated another way, each user's performance score value may equate to a set monetary amount per performance score unit (i.e., performance point). With $10,000 distributed among 500 points, each point is worth a monetary amount of $20. At the end of the quarterly performance cycle, then, users 1-5 having performance scores as indicated in Table 1 will receive the award amount indicated in Table 1.

In the case where wager awards are included, a performance score distribution may be represented as illustrated in Table 2:

TABLE 2

| User | Performance Score | Performance Points | Wager Award | Total Award Points | Fractional Award | Award Amount |
|---|---|---|---|---|---|---|
| 1 | 120 | 120 | 62 | 182 | 182/625 = 29.12% | $2,912 |
| 2 | 114 | 114 | 34 | 148 | 148/625 = 23.68% | $2,368 |
| 3 | 98 | 98 | 0 | 98 | 98/625 = 15.68% | $1,568 |
| 4 | 88 | 88 | 13 | 101 | 101/625 = 16.16% | $1,616 |
| 5 | 80 | 80 | 0 | 80 | 80/625 = 12.8% | $1,280 |
| 6 | 60 | 0 | 0 | 0 | 0 | $0 |
| 7 | 56 | 0 | 16 | 16 | 16/625 = 2.56% | $256 |
| 8 | 51 | 0 | 0 | 0 | 0 | $0 |
| 9 | 45 | 0 | 0 | 0 | 0 | $0 |
| 10 | 36 | 0 | 0 | 0 | 0 | $0 |

Here, the total of the performance scores of the top 50 percentile of users (i.e., Users 1-5) is 500 and the total wager award is 125, for a grand total of 625. The award amount provided to Users 1-5 here is then the proportional amount of the user's performance score to the total of the performance scores of Users 1-5 and the total wager award, i.e., a fractional amount out of 625 points, and user 7, even though not in the top 50 percentile of performance scores receives an award based on the fractional amount of the wager award. This outcome is possible since the wager awards can arise out of performance wagers placed in the previous cycle regarding the current cycle, as described in more detail below. With $10,000 distributed among 625 points, each point is worth a monetary amount of $16. At the end of the quarterly performance cycle, then, users 1-5 and 7 having performance scores and wager awards as indicated in Table 2 will receive the award amounts indicated in Table 2. The total award amount here of $10,000 may be fixed for the particular performance period being evaluated. In some cases, the total award amount may optionally have an additional contribution from the value of performance wagers from a previous performance cycle, such as all performance wagers or only performance wagers that are won based on meeting a particular performance goal associated with the performance wager.

The awards distributed among the award-receiving various users may be presented to the users via various user interfaces and a user may be provided with various options for how to use the awards during a particular time duration. In some presentations, the award may be indicated as performance points being placed into a user's wallet, which may be an account associated with certain rules on how and when points can be transferred out or redeemed. For example, from the wallet, a user may be permitted to immediately redeem their earned performance points (e.g., for a cash payout or automated transfer to an account), or may optionally be permitted to carry over a fraction of their performance points to a subsequent performance cycle for use in performance wagers, such as at element 125 in FIG. 1. In such cases, users make wagers with these points based on their own predictions for performance in the next cycle. More details on this process are outlined below. For redemption of a performance point, the presentation may indicate the redeemed performance points added to the user's vault, which may be an account associated with certain rules on how and when points can be transferred out or redeemed. For example, points or value in the vault may only be transferred into money and may essentially be reserved for withdrawal only. In some cases, the wager awards for the current cycle are not available for subsequent wagering and are automatically added to the user's vault for immediate redemption with unwagered performance points, such as at element 130 in FIG. 1. The unwagered performance points and wager awards can be converted into a monetary value, such as cash value, and transferred to the user's cash account (e.g., bank account, PayPal account, Venmo account, etc.) at element 135 in FIG. 1.

For performance wagers, users may identify one or more performance goals they may believe they can meet during the subsequent performance cycle and identify a desired number of performance points to risk, as indicated at element 140. If the users are able to achieve the performance goal they may be awarded extra points in the form of a wager award based on certain criteria at the end of the subsequent performance cycle; wagers for performance goals that are not met do not receive any wager awards. For example, User 1 may desire to wager some number of performance points on a particular performance goal in a subsequent performance cycle.

As a specific example, User 1 may desire to wager 50 of the 200 performance points achieved in the performance cycle associated with Table 1 on a performance goal of performing at least 175 tasks within the next performance cycle. If User 1 is able to meet the performance goal by performing at least 175 tasks within the next performance cycle, User 1 may be awarded an extra amount in proportion to the amount wagered as a wager award. The wager award or a multiplicative factor representative thereof may be determined in advance, such as according to a design criteria. For example, 1.5 times the performance points wagered (75) may be rewarded if User 1 bets on a goal of 175 tasks and achieves that goal in the next cycle, but a factor of 2 times the performance points wagered (100) may be awarded if User 1 bets on a goal of 200 tasks in the and achieve that goal in the next cycle. Design criteria may be associated with or generated by a model, such as a statistical model, evaluating historical and/or expected performance for one or more users, and optionally using one or more subjective factors, which may be associated with user input, and/or one or more objective factors, which may be derived from fixed values, metrics, or predetermined information. In some cases, the design criteria may be associated with a distribution of historical performance by all users having the same role as User 1. In some cases, the design criteria may correspond to larger wager awards based on a determined position of the performance goal with respect to the distribution. The design criteria may also take into consideration the historical performance of User 1. In other words, reward payouts for wagers made may depend upon the amount initially wagered and the level of difficulty of the goal specified in the wager according to the odds of achieving that goal, such that the more difficult the goal the higher the multiplicative factor of the returned award.

For example, consider a normal distribution of number of tasks performed within a performance cycle by users having the same role as User 1 as having a median of 150 and a standard deviation of 20. The design criteria for the wager award may take into consideration this distribution. The design criteria may output or provide a factor to be applied based on the results of modeling. The design criteria may result in a simple multiplicative factor to be applied to the wagered amount of performance points, for example. For a performance goal of 150 tasks, the design criteria may generate a multiplicative factor of 1.0, for example, meaning no additional benefit may be awarded for such a performance goal. For a performance goal of 175 tasks, however, the design criteria may generate a multiplicative factor of 1.17 for a wager award that is 1.17× the wagered amount. For a higher, and thus more difficult to achieve, performance goal of 200 tasks, however, the design criteria may generate a multiplicative factor of 1.24. In some cases, users may be able to arbitrarily identify any suitable performance goal, with an associated multiplicative factor provided. In other cases, users may be able to select from a predefined set of performance goals and associated multiplicative factors. In the case of User 1 wagering 50 performance points on a performance goal of 175 tasks, as described above, User 1 may receive a wager award equivalent to 62 performance points (i.e., an additional 12 points) if User 1 is able to achieve the performance goal during the subsequent performance cycle and lose all wagered 50 performance points (i.e., receive a wager award equivalent to 0 points) if User 1 is unable to achieve the performance goal during the subsequent performance cycle.

After users assign performance points to wager (element 125 in FIG. 1) and the remaining performance points and wager awards are combined (element 130 in FIG. 1) and converted (element 135 in FIG. 1), the next performance cycle begins at element 105.

Figure 2:
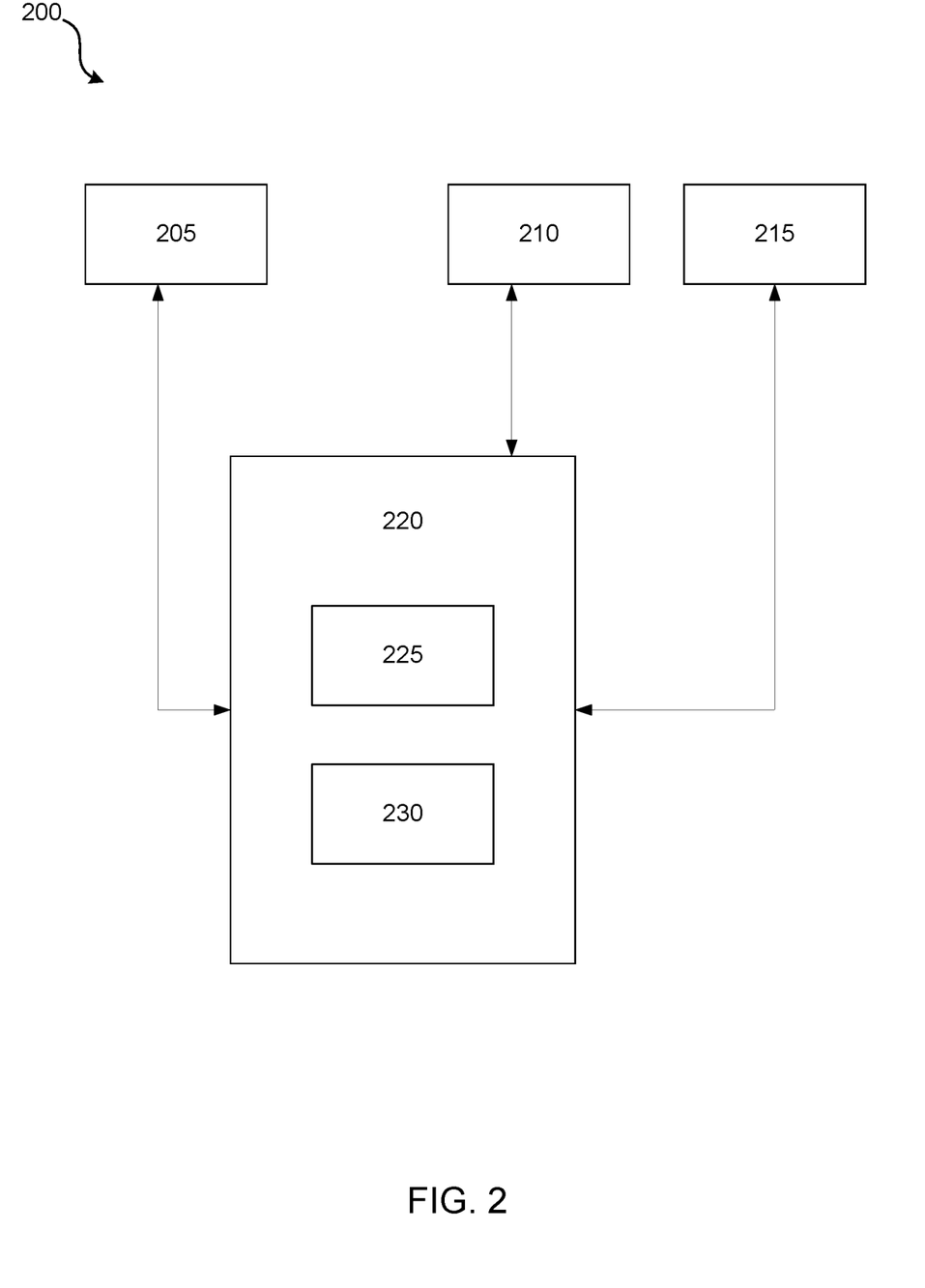
FIG. 2 provides a schematic overview of a performance monitoring and evaluation system in accordance with some embodiments.

FIG. 2 provides an overview of an example performance monitoring and evaluation system 200. System 200 includes a client event tracking system 205, user terminals 210 and 215, and application system 220. Event tracking system 205, user terminals 210 and 215, and application system 220 may communicate or exchange data with one another via one or more public or private network links, which may, at least in part, include portions of the public Internet. Additional or fewer systems may be included in performance monitoring and evaluation system 200 than illustrated and it will be appreciated that the identified components thereof are merely exemplary and not intended to be limiting.

Event tracking system 205 may comprise one or more subsystems that may track user activity and generate event information. For example, event tracking system 205 may receive or identify various details associated with user activity, such as activity start times, activity end times, and various values associated with the activity. The details may be used by event tracking system 205 to populate an event data table, such as in the form of a spreadsheet, database, text table, or other data table. The event data table may include individual entries associated with each piece of activity data. The individual entries in the event data table may or may not be correlated with other related events in the event data table. In some cases, tracking identifiers may be used in entries in the event data table to allow related activities to be correlated, such as one entry associated with starting a particular activity and another associated with stopping the particular activity. It will be appreciated that individual entries in an event data table may include or be associated with one or more identifiers to allow tracking of a user, group, or other hierarchy level associated with the related activity. It will also be appreciated that the event data table may not necessarily group entries of related events or of different users, but rather the event data table may include raw information that is generated as activities occur and/or as events are tracked or logged. In this way, the event data table may include event data for a plurality of users, for a plurality of unrelated activities and be in a mixed arrangement. In some cases, the event data table may be populated by client event tracking system with entries in a chronological fashion as the activities occur and/or as events are tracked or logged.

The event data table may be received by application system 220. In some cases application system 220 receives the event data table or a portion thereof on a routine basis, such as periodically. Optionally, application system 220 receives only newly added event data from the event data table since the last time the event data table was received. In some cases, the event data table is received at application system 220 from event tracking system 205 in response to a request from application system 220 for the event data table. In some cases, event tracking system 205 pushes all or portions of the event data table to application system 220. Regardless of the method of obtaining the event data table, application system 220 may receive the event data table, or a portion thereof, on a repeated basis, such as in real-time as new event data is added to the event data table, or according to a schedule (e.g., hourly, daily, weekly, etc.). Data communications between application system 220 and event tracking system 205 may be over one or more wired or wireless network links, for example. In some cases, the event data may also include subjective ratings data. Optionally, subjective ratings data may be directly communicated to application system 220 by way of a user terminal 210 and/or 215, and or via another system not depicted in FIG. 2.

Application system 220 may include a parsing subsystem 225 for reading and converting raw event data from the event data table into operational records representative of the event data on a per-user and per-activity basis. For example, parsing subsystem 225 may read each individual entry of raw event data in the event data table and identify a user and any other related entries in the event data table and generate an operational record list for each user, which may be stored in a database 230 in application system 220.

Application system 220 may also generate one or more metrics, based on predefined formulas or algorithms for transforming operational records into the one or more metrics. As an example, a metric representing a number of tasks completed may be determined by counting completed tasks for each user as indicated in the operational records list in database 230. As another example, a metric representing an average time duration for all tasks for each user may be determined by computing a total time duration for all completed tasks for each user and dividing by the total number of tasks completed by the user.

Application system 220 may also generate performance scores for users and or groups of users, such as based on a hierarchical level. The generation of performances scores may operate as described herein, such as by transforming event data, subjective ratings data, and/or metric information according to a particular formula or algorithm. Performance scores may be used for generating and assigning awards and awarding of performance points.

Application system 220 may also generate one or more graphical interfaces for displaying metric information and/or performance points or other related information, such as on a user interface to be viewed by a user, such as on user terminals 210. The one or more graphical interfaces may correspond to a website, web page, web application, smartphone or tablet application, or the like. In some cases, user terminals 210 and/or 215 may present a graphical interface by transmitting a request to application system 220 and in response to the request application system 220 may transmit information to user terminals 210 and/or 215 needed to render the graphical interface. Data communications between application system 220 and user terminals 210 and/or 215 may occur over one or more wired or wireless network links, for example. User terminals 210 and/or 215 may optionally be or correspond to a wired or wireless computing or communications device, such as a desktop computer, tablet computer, laptop or other portable computer, smartphone, feature phone, or other computing device. In some cases, users may be able to provide input to application system 220 using user terminals 210 and/or 215, such as to provide subjective ratings data for one or more users. Application system 220 may also receive input, such as from user terminals 210 and/or 215, relating to wager information for performing certain aspects of the techniques described above.

Figure 3:
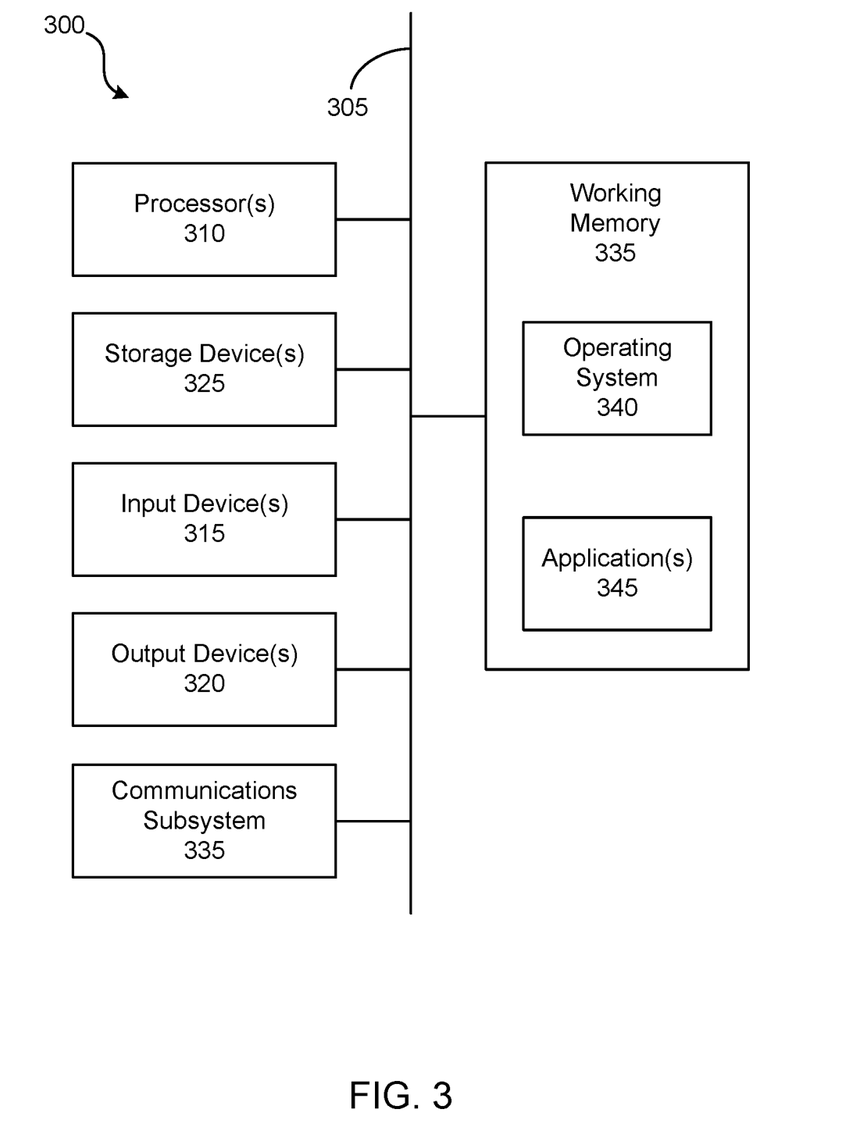
FIG. 3 provides a schematic illustration of an example computing device.

A computing device as illustrated in FIG. 3 may be incorporated as part of the previously described devices, such as event tracking system 205, user terminals 210 and 215, and application system 200, etc. FIG. 3 provides a schematic illustration of one embodiment of a computing device 300, which may optionally perform various steps of the methods described herein. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computing device 300 is shown comprising hardware elements that may be electrically coupled via a bus 305 (or may otherwise be in communication). The hardware elements may include one or more processors 310, including without limitation one or more general-purpose processors and/or one or more special-purpose processors (such as digital signal processing chips, graphics acceleration processors, video decoders, and/or the like); one or more input devices 315, which may include without limitation a mouse, a touchscreen, keyboard, remote control, voice input, and/or the like; and one or more output devices 320, which may include without limitation a display device, a printer, speaker, etc.

The computing device 300 may further include (and/or be in communication with) one or more non-transitory storage devices 325, which may comprise, without limitation, local and/or network accessible storage, and/or may include, without limitation, a disk drive, a drive array, an optical storage device, a solid-state storage device, such as a solid state drive ("SSD"), random access memory ("RAM"), and/or a read-only memory ("ROM"), which may be programmable, flash-updateable and/or the like. Such storage devices may be configured to implement any appropriate data stores, including without limitation, various file systems, database structures, and/or the like.

The computing device 300 might also include a communications subsystem 330, which may include without limitation a modem, a network card (wireless or wired), an infrared communication device, a wireless communication device, and/or a chipset (such as a Bluetooth device, BLE, an 802.11 device, an 802.15.4 device, a WiFi device, a WiMax device, cellular communication device, etc.), a G.hn device, and/or the like. The communications subsystem 330 may permit data to be exchanged with a network (such as the network described below, to name one example), other computer systems, and/or any other devices described herein. In many embodiments, the computing device 300 will further comprise a working memory 335, which may include a RAM or ROM device, as described above.

The computing device 300 also may comprise software elements, shown as being 30 currently located within the working memory 335, including an operating system 340, device drivers, executable libraries, and/or other code, such as one or more application programs 345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the non-transitory storage device(s) 325 described above. In some cases, the storage medium might be incorporated within a computer system, such as computing device 300. In other embodiments, the storage medium might be separate from a computer system (e.g., a removable medium, such as a compact disc, or a cloud- or network-based storage system), and/or provided in an installation package, such that the storage medium may be used to program, configure, and/or adapt a general purpose computer with the instructions/code stored thereon. These instructions might take the form of executable code, which is executable by the computing device 300 and/or might take the form of source and/or installable code, which, upon compilation and/or installation on the computing device 300 (e.g., using any of a variety of generally available compilers, installation programs, compression/decompression utilities, etc.), then takes the form of executable code.

It will be appreciated that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computing device (such as the computing device 300) to perform methods in accordance with various embodiments of the invention. According to a set of embodiments, some or all of the procedures of such methods are performed by the computing device 300 in response to processor 310 executing one or more sequences of one or more instructions (which might be incorporated into the operating system 340 and/or other code, such as an application program 345) contained in the working memory 335. Such instructions may be read into the working memory 335 from another computer-readable medium, such as one or more of the non-transitory storage device(s) 325. Merely by way of example, execution of the sequences of instructions contained in the working memory 335 might cause the processor(s) 310 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computing device 300, various computer-readable media might be involved in providing instructions/code to processor(s) 310 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 325. Volatile media include, without limitation, dynamic memory, such as the working memory 335.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer may read instructions and/or code. Network-based and cloud-based storage systems may also be useful forms of computer-readable media.

Various forms of computer-readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 300.

The communications subsystem 330 (and/or components thereof) generally will receive signals, and the bus 305 then might carry the signals (and/or the data, instructions, etc. carried by the signals) to the working memory 335, from which the processor(s) 310 retrieves and executes the instructions. The instructions received by the working memory 335 may optionally be stored on a non-transitory storage device 325 either before or after execution by the processor(s) 310.

It should further be understood that the components of computing device 300 may be distributed across a network. For example, some processing may be performed in one location using a first processor while other processing may be performed by another processor remote from the first processor. Other components of computing device 300 may be similarly distributed. As such, computing device 300 may be interpreted as a distributed computing system that performs processing in multiple locations. In some instances, computing device 300 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter may be described in language specific to structural features and/or methodological acts, it is to be understood that the subject matter defined in the appended claims is not necessarily limited to the specific features or acts described above. Rather, the specific features and acts described above are disclosed as example forms of implementing the claims.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A graphical user interface system comprising:
one or more processors; and a non-transitory computer readable storage medium including instructions that, when executed by the one or more processors cause the one or more processors to perform operations including:

generating an interactive graphical user interface that is accessible to a plurality of computer terminals associated with a plurality of users over a network, the graphical user interface being configured to provide final performance scores for a performance cycle to the plurality of users, each individual user of the plurality of users being provided with their final performance score for the performance cycle and access to a digital wallet via the graphical user interface, the final performance score being computed for the user based on event data associated with activity of the user during a duration of the performance cycle, and the digital wallet being usable to store an award capable of being redeemed or transferred by the user, the graphical user interface being further configured to receive a user input for selectively converting the award into a monetary value for transfer over the network to an online financial account; and updating awards in a plurality of digital wallets associated with a first subset of the plurality of users by assigning portions of an award amount to the first subset of the plurality of users based on the final performance scores, wherein users of the first subset have corresponding award portions, and wherein the award amount is determined based on a characteristic of the plurality of users that is common among the plurality of users.

2. The graphical user interface system of claim 1, wherein the operations further comprise:
identifying a threshold performance score, wherein the first subset of the plurality of users corresponds to users of the plurality of users for which a corresponding final performance score is above the threshold performance score.

3. The graphical user interface system of claim 1, wherein the operations further comprise:
determining one or more interim performance scores on a periodic basis or in real-time during the performance cycle; and
generating an output providing the one or more interim performance scores using event data received during the performance cycle.

4. The graphical user interface system of claim 1, wherein the performance cycle corresponds to a period of time during which event data is generated and accumulated based on activity of the plurality of users; or wherein the duration for the performance cycle is user customizable.

5. The graphical user interface system of claim 1, wherein the characteristic of the plurality of users includes an employment role, a geographical location, an employment group, or a hierarchical level in an organization that is common among the plurality of users.

6. The graphical user interface system of claim 1, wherein the activity corresponds to one or more of a number of tasks completed, an average task duration, a shortest task duration, or a longest task duration.

7. The graphical user interface system of claim 1, wherein the operations further include:
identifying an algorithm for evaluating event data to generate performance scores, wherein determining the final performance scores includes using the algorithm and the event data.

8. The graphical user interface system of claim 1, wherein the operations further include:

identifying a new award amount for a new performance cycle;
determining that a new start of the new performance cycle has occurred;
receiving new event data associated with activity of the plurality of users during the new performance cycle;
determining that a new end of the new performance cycle has occurred;
determining new final performance scores for the plurality of users during the new performance cycle using the new event data, wherein individual users of the plurality of users have corresponding new final performance scores; and
assigning new portions of the new award amount to a new subset of the plurality of users based on the new final performance scores, wherein individual users of the new subset are assigned corresponding new award portions.

9. A method comprising:
generating, by one or more processors, an interactive graphical user interface that is accessible to a plurality of computer terminals associated with a plurality of users over a network, the graphical user interface being configured to provide final performance scores for a performance cycle to the plurality of users, each individual user of the plurality of users being provided with their final performance score for the performance cycle and access to a digital wallet via the graphical user interface, the final performance score being computed for the user based on event data associated with activity of the user during a duration of the performance cycle, and the digital wallet being usable to store an award capable of being redeemed or transferred by the user, the graphical user interface being further configured to receive a user input for selectively converting the award into a monetary value for transfer over the network to an online financial account; and
updating, by the one or more processors, awards in a plurality of digital wallets associated with a first subset of the plurality of users by assigning portions of an award amount to the first subset of the plurality of users based on the final performance scores, wherein users of the first subset have corresponding award portions, and wherein the award amount is determined based on a characteristic of the plurality of users that is common among the plurality of users.

10. The method of claim 9, further comprising:
identifying a threshold performance score, wherein the first subset of the plurality of users corresponds to users of the plurality of users for which a corresponding final performance score is above the threshold performance score.

11. The method of claim 9, further comprising:
determining one or more interim performance scores on a periodic basis or in real-time during the performance cycle; and
generating an output providing the one or more interim performance scores using event data received during the performance cycle.

12. The method of claim 9, wherein the performance cycle corresponds to a period of time during which event data is generated and accumulated based on activity of the plurality of users.

13. The method of claim 9, wherein the characteristic of the plurality of users includes an employment role, a geographical location, an employment group, or a hierarchical level in an organization that is common among the plurality of users; or wherein the activity corresponds to one or more of a number of tasks completed, an average task duration, a shortest task duration, or a longest task duration.

14. The method of claim 9, further comprising:
identifying a new award amount for a new performance cycle;
determining that a new start of the new performance cycle has occurred;
receiving new event data associated with activity of the plurality of users during the new performance cycle;
determining that a new end of the new performance cycle has occurred;
determining new final performance scores for the plurality of users during the new performance cycle using the new event data, wherein individual users of the plurality of users have corresponding new final performance scores; and
assigning new portions of the new award amount to a new subset of the plurality of users based on the new final performance scores, wherein individual users of the new subset are assigned corresponding new award portions.

15. A computer program product comprising a non-transitory computer readable storage medium, the non-transitory computer readable storage medium including instructions that, when executed by one or more processors, cause the one or more processors to perform operations comprising:
generating an interactive graphical user interface that is accessible to a plurality of computer terminals associated with a plurality of users over a network, the graphical user interface being configured to provide final performance scores for a performance cycle to the plurality of users, each individual user of the plurality of users being provided with their final performance score for the performance cycle and access to a digital wallet via the graphical user interface, the final performance score being computed for the user based on event data associated with activity of the user during a duration of the performance cycle, and the digital wallet being usable to store an award capable of being redeemed or transferred by the user, the graphical user interface being further configured to receive a user input for selectively converting the award into a monetary value for transfer over the network to an online financial account; and
updating awards in a plurality of digital wallets associated with a first subset of the plurality of users by assigning portions of an award amount to the first subset of the plurality of users based on the final performance scores, wherein users of the first subset have corresponding award portions, and wherein the award amount is determined based on a characteristic of the plurality of users that is common among the plurality of users.

16. The computer program product of claim 15, wherein the operations further comprise:
identifying a threshold performance score, wherein the first subset of the plurality of users corresponds to users of the plurality of users for which a corresponding final performance score is above the threshold performance score.

17. The computer program product of claim 15, wherein the operations further comprise:
determining one or more interim performance scores on a periodic basis or in real-time during the performance cycle; and
generating an output providing the one or more interim performance scores using event data received during the performance cycle.

18. The computer program product of claim 15, wherein the performance cycle corresponds to a period of time during which event data is generated and accumulated based on activity of the plurality of users.

19. The computer program product of claim 15, wherein the characteristic of the plurality of users includes an employment role, a geographical location, an employment group, or a hierarchical level in an organization that is common among the plurality of users; or wherein the activity corresponds to one or more of a number of tasks completed, an average task duration, a shortest task duration, or a longest task duration.

20. The computer program product of claim 15, wherein the operations further comprise:
identifying a new award amount for a new performance cycle;
determining that a new start of the new performance cycle has occurred;
receiving new event data associated with activity of the plurality of users during the new performance cycle;
determining that a new end of the new performance cycle has occurred;
determining new final performance scores for the plurality of users during the new performance cycle using the new event data, wherein individual users of the plurality of users have corresponding new final performance scores; and
assigning new portions of the new award amount to a new subset of the plurality of users based on the new final performance scores, wherein individual users of the new subset are assigned corresponding new award portions.

* * * * *